United States Patent
Hasl

(10) Patent No.: US 8,950,802 B2
(45) Date of Patent: Feb. 10, 2015

(54) STRUCTURAL CONSTRUCTION UNIT

(75) Inventor: Paul Hasl, Liberec (CS)

(73) Assignee: Magna International Inc., Aurora (CA)

( * ) Notice: Subject to any disclaimer, the term of this patent is extended or adjusted under 35 U.S.C. 154(b) by 0 days.

(21) Appl. No.: 13/581,119

(22) PCT Filed: Feb. 25, 2011

(86) PCT No.: PCT/IB2011/000817
§ 371 (c)(1),
(2), (4) Date: Oct. 31, 2012

(87) PCT Pub. No.: WO2011/104636
PCT Pub. Date: Sep. 1, 2011

(65) Prior Publication Data
US 2013/0049406 A1    Feb. 28, 2013

(30) Foreign Application Priority Data
Feb. 25, 2010 (DE) .......................... 10 2010 009 354

(51) Int. Cl.
*B62D 25/14* (2006.01)
*B62D 29/00* (2006.01)

(52) U.S. Cl.
CPC ............ *B62D 29/001* (2013.01); *B62D 25/145* (2013.01)
USPC .................... 296/193.02; 296/72; 296/203.02

(58) Field of Classification Search
USPC ............. 296/203.02, 193.06, 193.09, 193.01, 296/209, 70, 72; 293/117
IPC ....................................................... B62D 25/14
See application file for complete search history.

(56) References Cited

U.S. PATENT DOCUMENTS

| | | | |
|---|---|---|---|
| 4,765,672 A | 8/1988 | Weaver | |
| 6,464,289 B2 * | 10/2002 | Sigonneau et al. | 296/193.09 |
| 6,877,787 B2 * | 4/2005 | Ito et al. | 296/70 |
| 6,893,524 B2 * | 5/2005 | Green | 156/180 |
| 6,926,787 B2 * | 8/2005 | Hauser | 156/177 |
| 7,152,896 B2 * | 12/2006 | Roeth et al. | 296/30 |
| 7,284,789 B2 * | 10/2007 | Wolf | 296/208 |
| 7,665,778 B2 * | 2/2010 | Henseleit | 293/102 |
| 7,926,870 B2 * | 4/2011 | Lorenzo et al. | 296/193.1 |
| 8,047,603 B2 * | 11/2011 | Goral et al. | 296/187.03 |
| 8,220,850 B2 * | 7/2012 | Opperman et al. | 293/120 |

(Continued)

FOREIGN PATENT DOCUMENTS

| | | |
|---|---|---|
| DE | 10 2008 013 506 | 9/2008 |
| EP | 0 370 342 | 5/1990 |

(Continued)

*Primary Examiner* — Pinel Romain
(74) *Attorney, Agent, or Firm* — Warn Partners, P.C.

(57) ABSTRACT

A structural part, in particular a structural part designed as a transverse supporting member for connection between the A columns of a motor vehicle and, more in particular as a structural part in tailgates or bumper supporting members, is to be developed in such a way that it has low weight, high mechanical stability and rigidity and is simple and inexpensive to produce. To do this, the structural part (1, 1') is designed with a number of elongated closed or half-open synthetic material structures (2, 3), which in outer regions (4, 5) surround reinforcing filaments (6) running in the longitudinal direction (A) sectionwise, wherein the reinforcing filaments (6) are held form-lockingly in the respective synthetic material structure (2, 3) by means of formations (7) in their surface, so as to absorb tensile forces in bending of the structural part (1, 1').

10 Claims, 3 Drawing Sheets

(56) References Cited

U.S. PATENT DOCUMENTS

| | | | | |
|---|---|---|---|---|
| 2003/0184099 A1* | 10/2003 | Van Damme et al. | ........ | 293/120 |
| 2004/0094976 A1* | 5/2004 | Cate et al. | .................... | 293/120 |
| 2004/0169399 A1* | 9/2004 | Scott et al. | ............... | 296/190.02 |
| 2008/0116701 A1* | 5/2008 | Boumaza et al. | ............. | 293/120 |
| 2008/0203743 A1* | 8/2008 | Dekeyser et al. | ............. | 293/120 |
| 2009/0091061 A1* | 4/2009 | Opperman et al. | ........... | 264/261 |
| 2009/0309387 A1* | 12/2009 | Goral et al. | .............. | 296/187.03 |

FOREIGN PATENT DOCUMENTS

| | | |
|---|---|---|
| EP | 1 112 915 | 7/2001 |
| FR | 2 877 633 | 5/2006 |
| WO | 2010/069087 | 6/2010 |

* cited by examiner

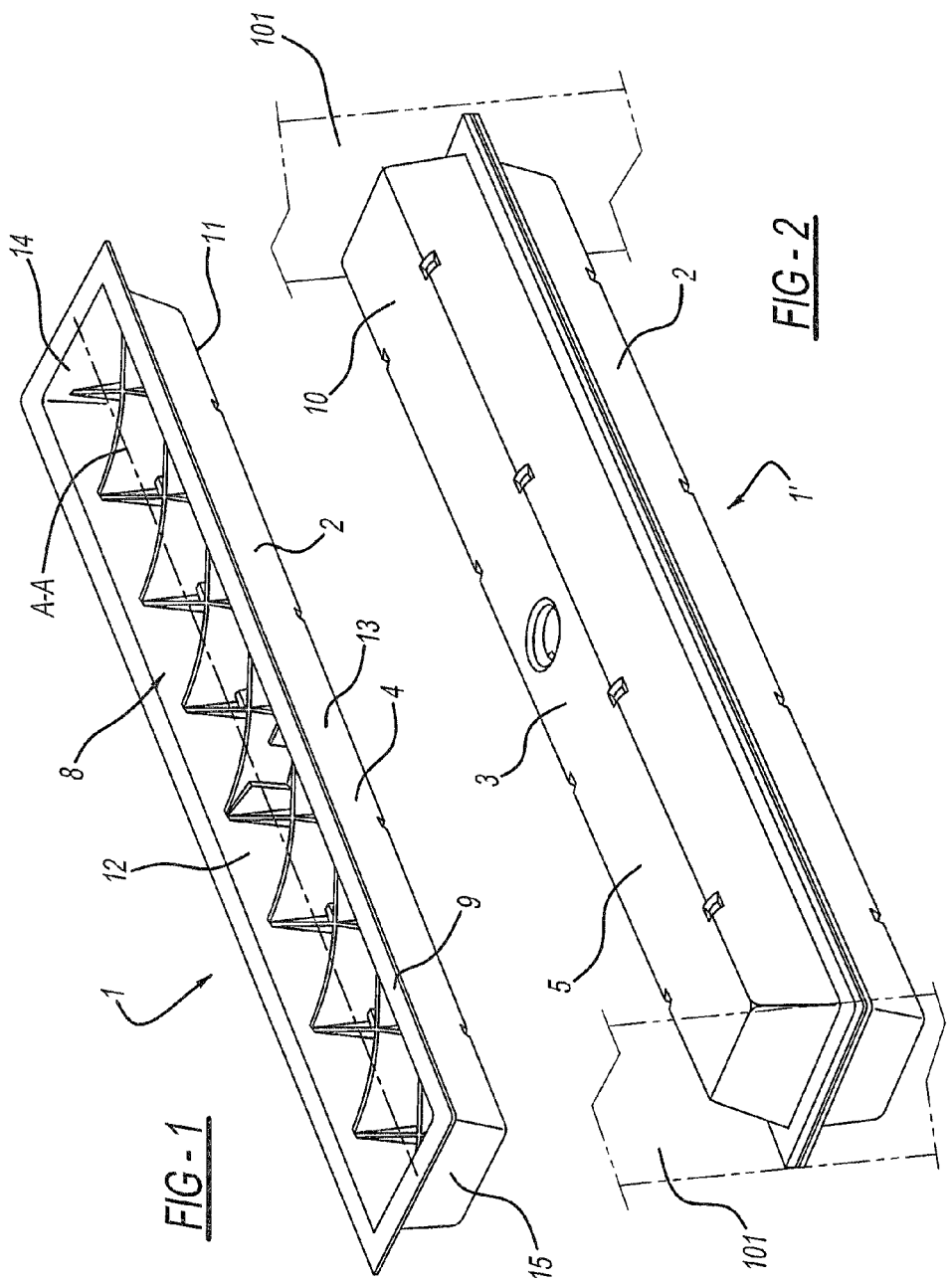

STRUCTURAL CONSTRUCTION UNIT

CROSS-REFERENCE TO RELATED APPLICATIONS

This application is a National Stage of International Application No. PCT/IB2011/000817, filed Feb. 25, 2011, which claims priority to DE 102010009354.8, filed Feb. 25, 2010. The disclosure of the above applications is incorporated herein by reference.

FIELD OF THE INVENTION

The present invention relates to a structural part for supporting a vehicle instrument panel.

BACKGROUND OF THE INVENTION

Structural parts of this kind may be used, for example, as supporting structures in motor vehicles, in particular as transverse supporting members in motor vehicles behind the instrument panel. A transverse supporting member of this kind in a motor vehicle serves to procure a connection between the A columns, on which the instrument panel, the air conditioner, the steering wheel-side steering column bearing, the airbag and other subassemblies may be suspended. For this purpose, the transverse supporting member must have high rigidity, so as to be able to resist the forces introduced from the steering column connection through the steering wheel.

Such transverse supporting members are well known from tubular steel constructions. However, these have very high weight, which is disadvantageous for fuel consumption. In further developments, transverse supporting members of a combination of metal and synthetic material have therefore been produced for the reduction of weight. EP 0,370,342 discloses such a transverse supporting member in hybrid construction. The latter has a dish-like basic element of metal, in the interior of which are arranged reinforcing ribs. These reinforcing ribs consist of injected synthetic material and are connected by the basic element to a plurality of apertures.

The object of the present invention is to further develop a structural part, in particular a structural part designed as a transverse supporting member for the connection between the A columns of a motor vehicle, in such a way that it has low weight, high mechanical stability and rigidity and is simple and inexpensive to produce.

SUMMARY OF THE INVENTION

A structural part for supporting structures in a motor vehicle having a number of elongated closed or half-open synthetic material structures. Outer regions of the material structure surround reinforcing filaments extending parallel to an axis of the structural part. Each reinforcing filament has formations on its surface that hold the reinforcing filament to respective synthetic material structure so as to absorb tensile forces in bending of the structural part.

The use of synthetic materials allows a distinct reduction in the total weight of the structural part to be obtained. By injection around and integration of the reinforcing filaments in the outer region of the structural part, high rigidity is still obtained. The embodiment according to the invention permits production at lower cost than in the case of structural parts that are made as stamped steel parts or tubular frame structures. Embedding of reinforcing filaments in the outer regions of the synthetic material structure results in improved crash behavior in the use of structural parts in motor vehicles.

When wires are used as reinforcing filaments, an inexpensive structural part can be produced by means of simple commercially available elements. For variously formed structural parts, the wires may be preformed in simple fashion.

Structural parts designed according to the invention may also be provided in tailgates, side doors or bumper supporting members as supporting structures, so as to absorb tensile forces in bending of the structural part.

Advantageous embodiments of the present invention are indicated in the dependent claims.

BRIEF DESCRIPTION OF THE DRAWINGS

The invention will be described below with reference to exemplary embodiments illustrated in the drawing, wherein:

FIG. 1 shows a structural part according to the invention in perspective representation in a half-open tub-like embodiment;

FIG. 2, an additional exemplary embodiment of a structural part in perspective representation with an elongated closed structure of synthetic material;

DETAILED DESCRIPTION OF THE DRAWINGS

Figure 3:
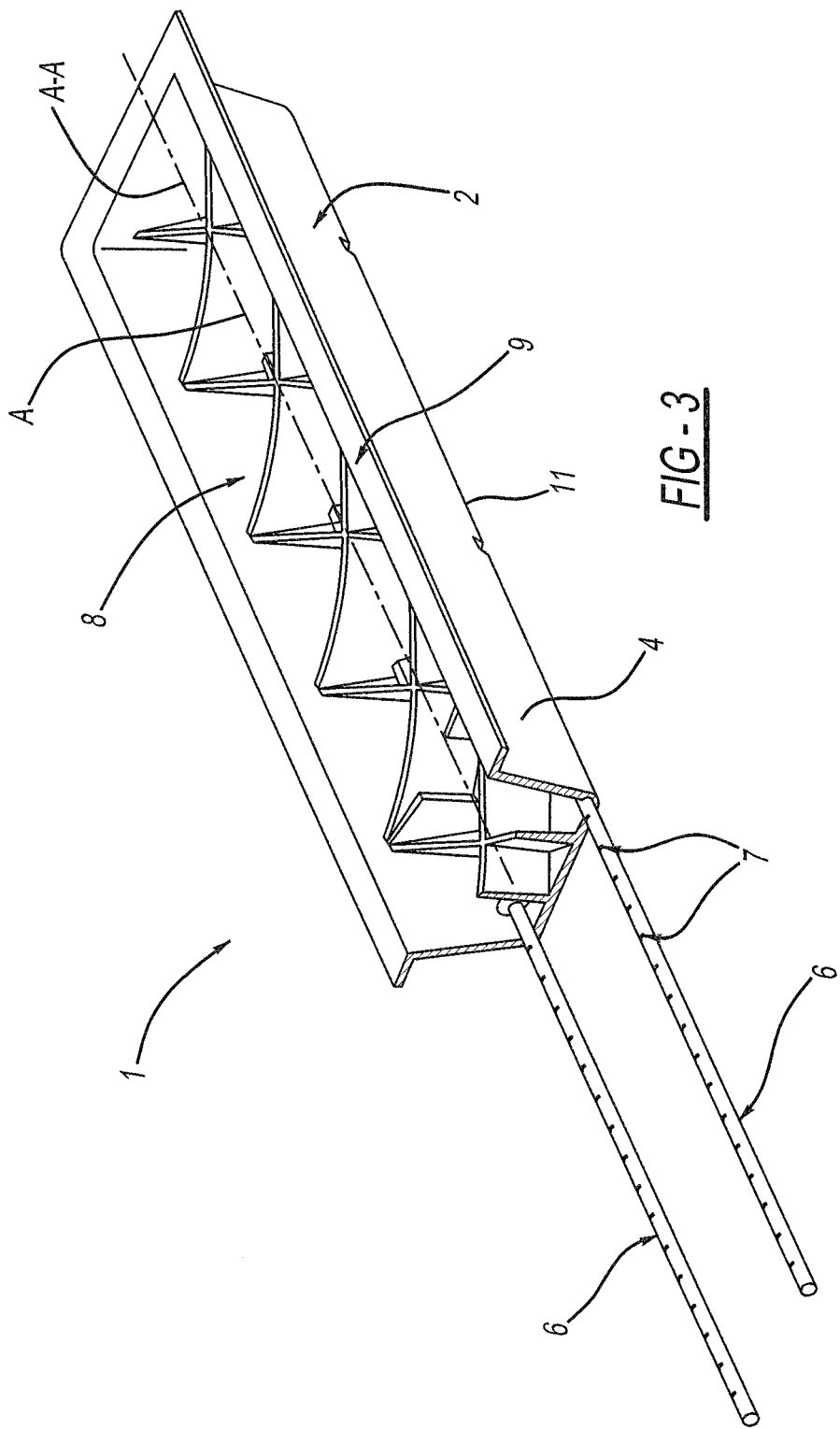
FIG. 3, the embodiment of FIG. 1 in a cut-open representation with reinforcing filaments exposed.

FIG. 1 shows in an exploded view an embodiment of a structural part 1, which has an elongated dish-like basic element of a synthetic material. The longitudinal axis of the basic element is labeled A. The basic element has in cross section a substantially U-shaped structure and is limited by a floor surface 11, two elongated side surfaces 12, 13 and two end-side surfaces 14, 15 running transversely. The side surfaces 12, 13, 14, 15 of the basic element are bent over outward at right angles at the upper side edges and form a peripheral angled edge region 9. The basic element forms the outer regions 4 of the synthetic material structure. These reinforcing ribs 8 of synthetic material are located in the interior of the basic element between the side walls 12, 13, 14, 15. These reinforcing ribs 8 form an inner rib structure and starting from the side walls 12, 13 are arranged at an angle of between 30 and 60 degrees, preferably 45 degrees. In the exemplary embodiment illustrated in the drawing, the reinforcing ribs 8, starting from the side walls 12, 13 run at an angle of +/− 45 degrees. As shown, these reinforcing ribs 8 are arranged in such a way that they form a diamond-shaped grid in the interior of the basic element. So as to increase the stability of the synthetic material structure, reinforcing filaments 6, running in the longitudinal direction A, are embedded in the edge regions of the floor surface 11. These reinforcing filaments 6, in the exemplary embodiment shown, are designed as metal wires, which have formations 7 in their surface. These formations 7 may be holes, grooves or the like, arranged regularly spaced apart. The reinforcing filaments 6 are made of metal, in particular steel, and have a coating for the prevention of corrosion. The reinforcing filaments preferably have a diameter of 3-4 mm. In an additional embodiment, the reinforcing filaments are made of organoplates, metal strips, shaped metal parts or wire mesh.

In production of the structural part 1, 1', the reinforcing filaments 6 of metal are coated with synthetic material. Upon injection of the synthetic material into the corresponding formations 7 in the reinforcing filaments 6, the required form-lock between synthetic material and metal is obtained. In additional embodiments of the invention, the reinforcing filaments 6 may be arranged along the entire longitudinal extension of the structural part 1, 1', or alternatively be provided only sectionwise.

In production of the structural part, in a first step the reinforcing filaments 6, designed as wires, are placed, spaced apart parallel, in an injection mold. Then, the basic element with reinforcing ribs is coated, and thus the reinforcing filaments 6 are coated with the synthetic material compound. Connecting elements for the various sub-assemblies may likewise be formed directly onto the structural part in the injection molding method. Further details concerning the injection molding operation are omitted here, since they are well known to those skilled in the art. Thermoplastic composite materials, for example glass-, carbon-, or aramide fiber-reinforced thermoplastics such as, for example polypropylene, polyamide, polycarbonate, may be used as synthetic materials for the basic element with reinforcing ribs.

In additional embodiments, the basic element may have other designs in cross section and in length. The reinforcing filaments 6, formed as wires, may then be adapted to the corresponding shape of the basic element in simple fashion.

In the embodiment shown in FIG. 3, two dish-like half-open structural parts 2, 3 are joined to make a closed structural part. The individual structural parts 2, 3 are identically constructed and correspond to the embodiment described for FIGS. 1 and 3. The two half-open structural parts are connected along their surrounding angled longitudinal and transverse edges 9. The connection at these seams may be made by cementing or welding. Owing to the connection of two half-open structural parts 2, 3, a structural part 1' with a closed cross section, which has still greater rigidity, can be obtained.

Figure 4:
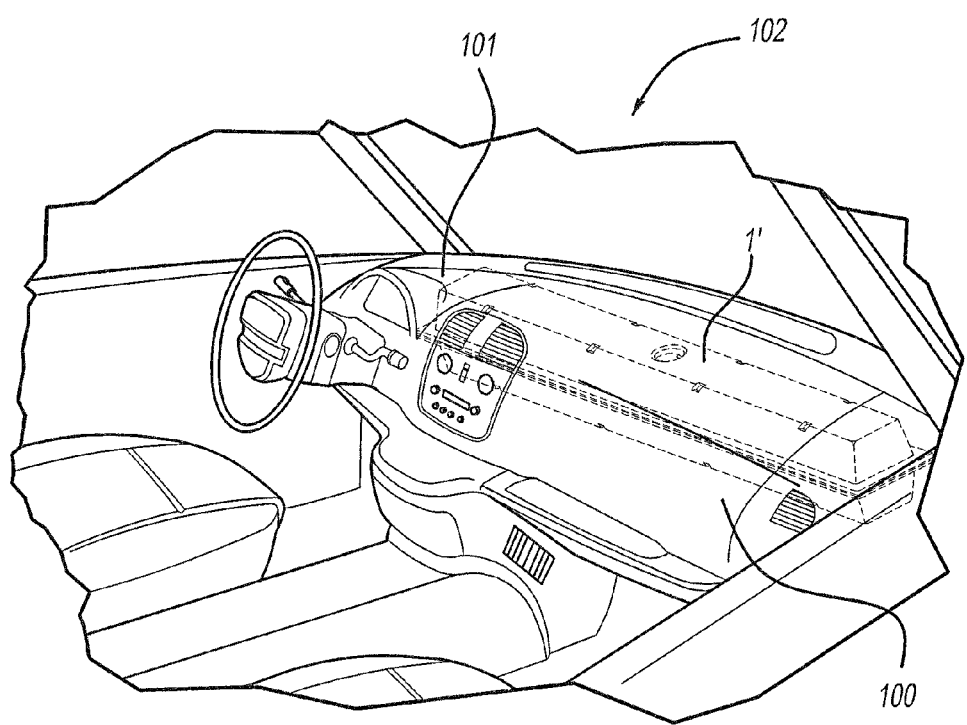
FIG. 4 is an angled side perspective view of a vehicle instrument panel with the structural part located between the A columns.

Referring now to FIGS. 2 and 4, the structural part 1' is shown for supporting a vehicle instrument panel 100. The structural component 1' is designed as a transverse supporting member for the connection between A columns 101 of a motor vehicle 102.

The invention claimed is:

1. A structural part for supporting a vehicle instrument panel connected between A columns of a motor vehicle comprising:
   a number of elongated closed or half-open synthetic material structures of the structural part connected between A columns of the motor vehicle, wherein the elongated closed or half-open synthetic material structures have a half-open tub-like shape reinforced by one or more inner ribs;
   outer regions surround one or more metal wires extending parallel to a longitudinal axis of the structural part, wherein said one or more metal wires are arranged along the entire length of the structural part;
   formations on a surface of the one or more metal wires, wherein the formations create a form-lock between the one or more metal wires and the synthetic material structures to embed the one or more metal wires in the synthetic material structure, wherein the one or more metal wires are embedded in edge regions of a floor surface of the synthetic material structures so as to absorb tensile forces in bending of the structural part.

2. The structural part of claim 1, further comprising two half-open tub-like synthetic material structures joined by a joint, said two half-open tub-like synthetic material structures form a closed box structure.

3. The structural part of claim 2, wherein the joint preferably is made by a cementing or welding connection along a surrounding flange surface.

4. The structural part of claim 1 wherein the one or more metal wires, which preferably have a diameter of 3-4 mm.

5. The structural part of claim 1 wherein the synthetic material structures consist of thermoplastic composite materials, in particular glass-, carbon- or aramide fiber-reinforced thermoplastics, preferably polypropylene, polyamide, polycarbonate.

6. A structural part for supporting a vehicle instrument panel connected between A columns of a motor vehicle comprising:
   two half-open tub-like synthetic material structures each having an edge, wherein the two half-open tub-like synthetic material structures are joined together by said edge at a joint, said two half-open tub-like synthetic material structures form a closed box structure of the structural part connected between A columns of the motor vehicle;
   outer regions of each said two half-open tub-like synthetic material structures surrounding one or more metal wires that extend parallel to a longitudinal axis of the structural part, wherein said one or more metal wires are arranged along an entire length of the structural part; and
   formations on a surface of the one or more metal wires, wherein the formations create a form-lock between the one or more metal wires and the one of said two half-open tub-like synthetic material structures to embed the one or more metal wires in each two half-open tub-like synthetic material structures, wherein the one or more metal wires are embedded in edge regions of a floor surface in each two half-open tub-like synthetic material structures so as to absorb tensile forces in bending of the structural part.

7. The structural part of claim 6 wherein each of said two half-open tub-like synthetic material structures has one or more inner ribs.

8. The structural part of claim 6, wherein the joint preferably is made by a cementing or welding connection along a surrounding flange surface.

9. The structural part of claim 6 wherein the one or more metal wires preferably have a diameter of 3-4 mm.

10. The structural part of claim 6 wherein the synthetic material structures consist of thermoplastic composite materials, in particular glass-, carbon- or aramide fiber-reinforced thermoplastics, preferably polypropylene, polyamide, polycarbonate.

* * * * *